N. B. COOPER.
Cultivator.
No. 36,139.
Patented Aug. 12, 1862.
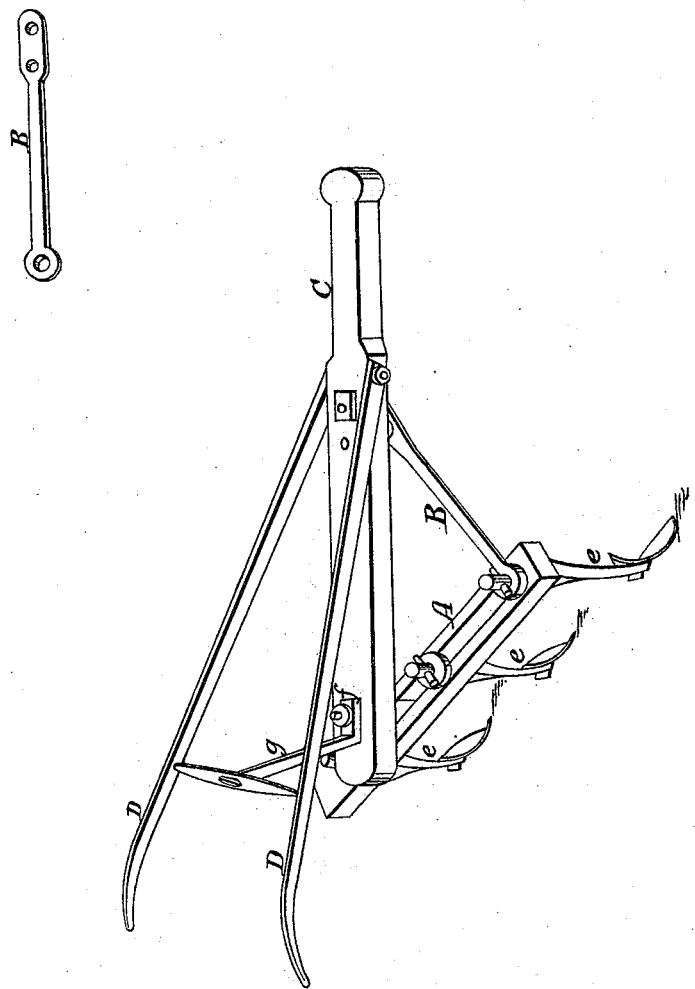
Witnesses:
A. A. Yeatman
D. Somes
Inventor:
N. B. Cooper

UNITED STATES PATENT OFFICE.

N. B. COOPER, OF GRATIS, OHIO.

IMPROVEMENT IN CULTIVATORS.

Specification forming part of Letters Patent No. 36,139, dated August 12, 1862.

*To all whom it may concern:*

Be it known that I, N. B. COOPER, of Gratis, Preble county, and State of Ohio, have invented certain new and useful Improvements in Cultivators; and I hereby declare that the following is a true and exact description of the same, reference being had to the accompanying drawing, and to the letters of reference marked thereon.

The nature of my invention consists in constructing a cultivator which by a simple arrangement can be adapted to rows of different widths—such as constantly occur in fields of Indian corn. In laying off ground for planting there will often be a difference of from six to twelve inches in adjoining rows, and the cultivator that is exactly suited to the narrow row will in the broad one leave a part of the soil unplowed. By my arrangement this evil is avoided, as in a moment my cultivator can be adjusted to either a narrow or broad land.

The drawing annexed gives a perspective view of my cultivator.

C is the beam; D D, the handles; and $e\ e\ e$ the standards to which the shovels are attached. From the center of the cross-tie that unites the handles the brace $g$ descends, the lower end formed so as to admit a screw to pass through it and secure it to the beam C, and to the slotted beam A, under the beam, a washer preventing the head of the screw from passing through the link. As the link is open except at the ends, the upper ends of the standards extend through it, and are kept in their position by pins, which are easily removed when the standards require change of place. B, the adjustable rod, is connected with the beam by means of a screw passing through it and through the beam, several holes being made in both, so that the position of the rod can be altered to effect the object designed, which is to draw in or force out the end of the link to which the rod is fastened. In addition to this advantage of changing the position of the shovels, the slotted beam A itself can be adjusted by means of the screw $f$, so as to throw all the shovels to the left or right of the beam at pleasure.

Having thus accurately described my invention, what I claim, and desire to secure by Letters Patent, is—

The arrangement of the slotted beam A, adjustable rod B, and beam C, for the purpose and in the manner herein set forth and described.

N. B. COOPER.

Witnesses:
    A. STEVER,
    JOHN BOOKWALTER.